United States Patent
Bowen et al.

(10) Patent No.: US 7,370,550 B1
(45) Date of Patent: May 13, 2008

(54) POWER TAKE-OFF UNIT

(75) Inventors: Thomas C. Bowen, Rochester Hills, MI (US); Ned Wright, Toledo, OH (US); Dan Stefan, Windsor (CA); Marius Enache, LaSalle (CA)

(73) Assignee: Dymos Co., Ltd., Farmington Hills, MI (US)

( * ) Notice: Subject to any disclaimer, the term of this patent is extended or adjusted under 35 U.S.C. 154(b) by 108 days.

(21) Appl. No.: 11/215,085

(22) Filed: Aug. 30, 2005

(51) Int. Cl.
*F16H 37/06* (2006.01)
*B60K 17/344* (2006.01)
(52) U.S. Cl. ............... 74/417; 74/665 F; 74/665 GD
(58) Field of Classification Search ........... 74/665 F, 74/665 G, 665 GA, 665 GB, 665 GC, 665 GD, 74/665 H, 416
See application file for complete search history.

(56) References Cited

U.S. PATENT DOCUMENTS

| | | | |
|---|---|---|---|
| 4,813,290 A | 3/1989 | Hone | |
| 4,862,769 A * | 9/1989 | Koga et al. ............... 475/86 |
| 5,099,704 A | 3/1992 | Williams et al. | |
| 5,170,674 A | 12/1992 | Williams et al. | |
| 5,289,730 A | 3/1994 | Wilson et al. | |
| 5,311,787 A | 5/1994 | Wilson et al. | |
| 6,250,411 B1 | 6/2001 | Nesbitt et al. | |
| 6,513,615 B2 | 2/2003 | Bowen et al. | |
| 6,533,692 B1 | 3/2003 | Bowen | |
| 6,582,337 B2 | 6/2003 | Bowen et al. | |
| 6,595,086 B2 | 7/2003 | Kobayashi | |
| 6,668,961 B2 | 12/2003 | Bowen et al. | |

* cited by examiner

*Primary Examiner*—Richard M. Lorence
*Assistant Examiner*—Edwin A Young
(74) *Attorney, Agent, or Firm*—David C. Purdue; John C. Purdue

(57) ABSTRACT

A power take-off unit includes an input shaft for operative connection to a source of motive power and a first drive gear operatively mounted to the input shaft and having a first set of drive teeth. The power take-off unit also includes a second drive gear having a second set of drive teeth and a first set of bevel teeth, the second set of drive teeth being meshingly engaged to the first drive teeth. The power take-off unit further includes an output gear mounted transversely to the second drive gear and having a second set of bevel teeth meshingly engaged to the first set of bevel teeth to transfer torque transversely from the input shaft to drive a set of wheels of a vehicle.

17 Claims, 4 Drawing Sheets

POWER TAKE-OFF UNIT

BACKGROUND OF THE INVENTION

1. Field of the Invention

The present invention relates generally to power take-off units and, more particularly, to a power take-off unit employed with a transmission of a vehicle to provide four-wheel drive capability.

2. Description of the Related Art

Generally speaking, land vehicles require three basic components. These components comprise a power plant (such as an internal combustion engine), a power train, and wheels. The internal combustion engine produces force by the conversion of chemical energy in a liquid fuel into the mechanical energy of motion (kinetic energy). The function of the power train is to transmit this resultant force to the wheels to provide movement of the vehicle.

The power train's main component is typically referred to as the "transmission". Engine torque and speed are converted in the transmission in accordance with the tractive-power demand of the vehicle. The vehicle's transmission is also capable of controlling the direction of rotation being applied to the wheels, so that the vehicle may be driven both forward and backward.

In larger or commercial vehicles, it is known to provide transmissions with power take-off units that provide a secondary source of torque, or rotational power, from the transmission to any of a variety of power driven accessories, implements, or devices. The power take-off unit and transmission can be structured to provide a selectable source of output power. The power take-off unit can also be structured to provide output power at a reduction or increase over that of the transmission output.

It is also known to provide vehicles with the ability to drive all four wheels (i.e., four-wheel drive) from the output of the transmission. Numerous approaches to providing four-wheel drive capability to a vehicle presently exist. Certain conventional approaches provide constant, or full-time, four-wheel drive that is not de-selectable. Other vehicle drive systems may provide part-time, user selectable four-wheel drive, or automatically selected part-time four-wheel drive. Still other four-wheel drive systems provide a combination of automatic and user selectable drive mechanisms.

One manner of providing four-wheel drive capability to motor vehicles has been to modify and adapt the traditional power take-off unit and power the forward wheels of a primarily rear wheel driven vehicle. One of the most notable approaches has been to employ a specific type of power take-off known as a "transfer case". Transfer cases have been generally employed within a drive train having a longitudinally mounted engine and transmission that is designed to drive the rear wheels. The transfer case takes torque output from the transmission, and passes the torque to the rear wheels. The transfer case also provides a secondary torque output, which is directed forward to a front differential to distribute torque to the front wheels. In most cases, the transfer case is selectable to engage or disengage the front wheels from the drive train.

In recent years, the consumer demand for four-wheel drive capability has expanded into almost all types of and styles of motor vehicles. Satisfying this demand has been problematic in some types of vehicles, especially those with transverse mounted engines or transaxle type transmissions that drive the front wheels. In response, a number of other adaptations of power take-off units have evolved to provide drive capability to both the front and rear wheels.

The newer approaches to the design of power take-off units for four-wheel drive vehicles that are designed to work with a transverse mounted transmission most often first drive the front wheels and use the power take-off unit to selectively drive the rear wheels. Known power take-off units of this type have the disadvantage of being bulky and complex. This disadvantage of conventional four-wheel drive power take-off units arises from the inclusion of one or more clutch mechanisms and planetary gear assemblies that are employed to transfer torque to the drive assemblies that drive the front and rear wheels. These associated assemblies require a great number of operative parts to be incorporated into the four-wheel drive power take-off unit, making it a large supplemental component of the drive train. Additionally, providing the operative torque through one or more power take-off clutch devices and/or planetary gear assemblies increases the likelihood of mechanical failures.

Other examples of conventional four-wheel drive power take-off units move the clutching assemblies and planetary gear systems into the transmission and transaxle and, in some cases, completely integrate the power take-off and transmission together. In these examples, shifting the complexity and bulk of the power take-off unit into the transmission or transaxle or merely integrating the power take-off unit into the transmission or transaxle itself only further enlarges the size of the transmission and increases its complexity. The underlying disadvantages still remain in the vehicle's drive train.

In any case, the size and complexity of the conventional four-wheel drive power take-off units makes it quite difficult to mount these devices in smaller more compact vehicles where physical space and ground clearance is already at a premium. Additionally, a power take-off unit employed for providing four wheel-drive capability must be robust enough to transfer torque to both sets of drive wheels under periods of physically demanding driving conditions. In this manner, attempting to simply reduce the size of the conventional power take-off units to allow them to fit within the physical restraints of a smaller motor vehicle is unacceptable as their load carrying capability is similarly reduced.

Therefore, it is desirable to provide a power take-off unit to be employed with a transverse transmission or transaxle of a motor vehicle that has reduced size and complexity compared to conventional units by reducing the number of parts, the overall size, and the cost. It is also desirable to provide a power take-off unit that employs a direct drive to one set of drive wheels without clutching mechanisms or planetary gear assemblies. It is further desirable to provide a power take-off unit that provides torque to all four wheels and is a separate unit from the transmission or transaxle. Therefore, there is a need in the art to provide a power take-off unit for use with a transverse mounted transmission or transaxle to provide four-wheel drive capability that meets these desires.

SUMMARY OF THE INVENTION

Accordingly, the present invention is a power take-off unit. The power take-off unit includes an input shaft operatively connected to a source of motive power. The power take-off unit also includes a first drive gear operatively mounted to the input shaft having a first set of drive teeth. The power take-off unit includes a second drive gear having a second set of drive teeth and a first set of bevel teeth. The second set of drive teeth are meshingly engaged to the first drive teeth of the first drive gear. The power take-off unit further includes an output gear operatively and rotationally mounted transversely to the second drive gear having a second set of bevel teeth meshingly engaged to the first set of bevel teeth of the second drive gear. The output gear is adapted to transfer torque transversely from the input shaft to drive a set of wheels of a vehicle.

One advantage of the present invention is that a power take-off unit is provided that has four-wheel drive capability and is employed with a transverse transmission or transaxle of a motor vehicle having reduced size and complexity compared to conventional units. Another advantage of the present invention is that the power take-off unit has a reduced number of parts, overall size, and cost. Yet another advantage of the present invention is that the power take-off unit provides a direct drive to one set of drive wheels without clutching mechanisms or planetary gear assemblies. A further advantage of the present invention is that the power take-off unit provides torque to four wheels as a separate unit, avoiding an increase to the complexity and bulk of the transmission or transaxle. Yet a further advantage of the present invention is that the power take-off unit has an overall reduction in the number of components, size, and weight, making the power take-off unit cost efficient.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
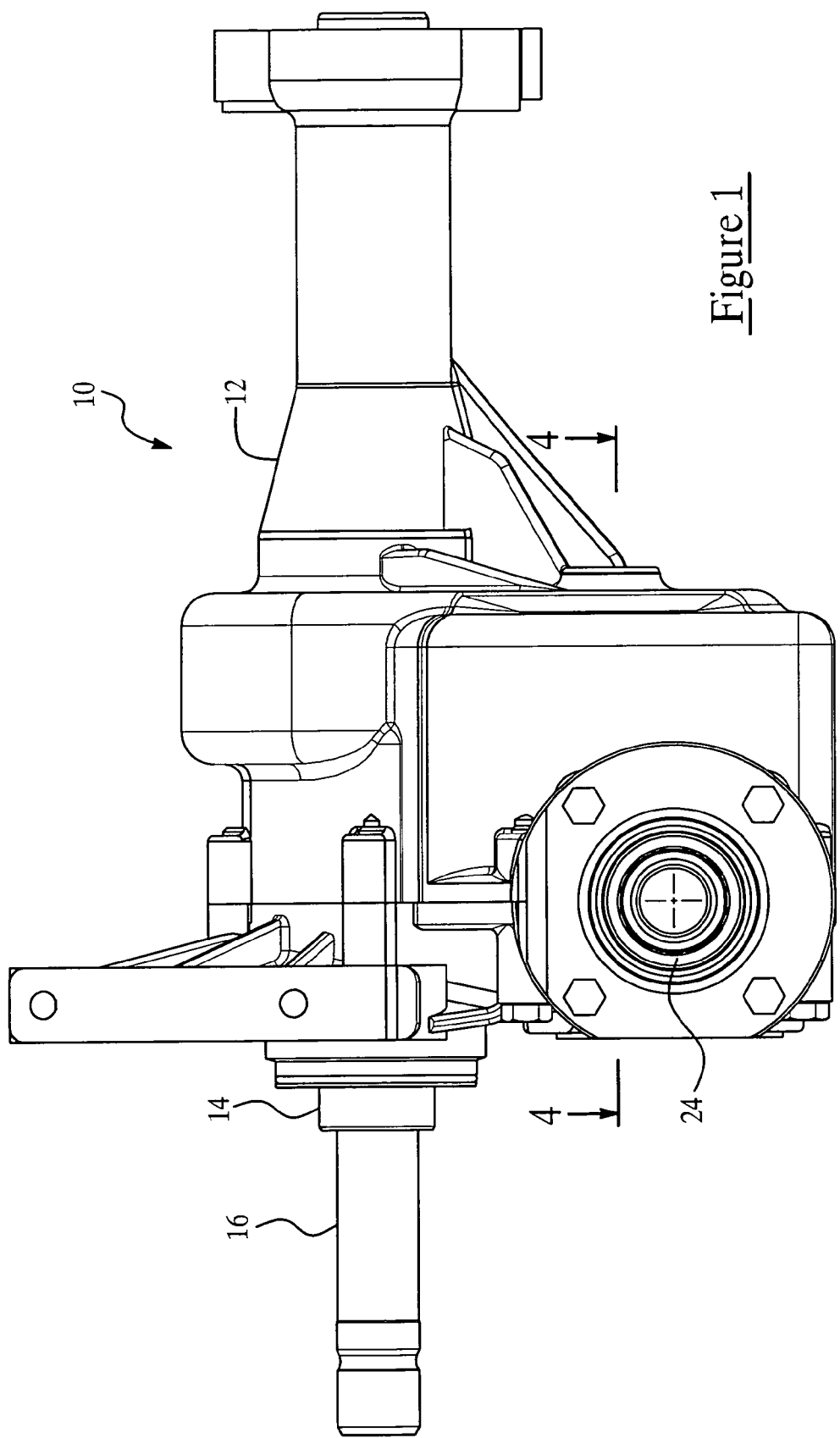
FIG. 1 is a side elevational view of a power take-off unit, according to the present invention.
Figure 2:
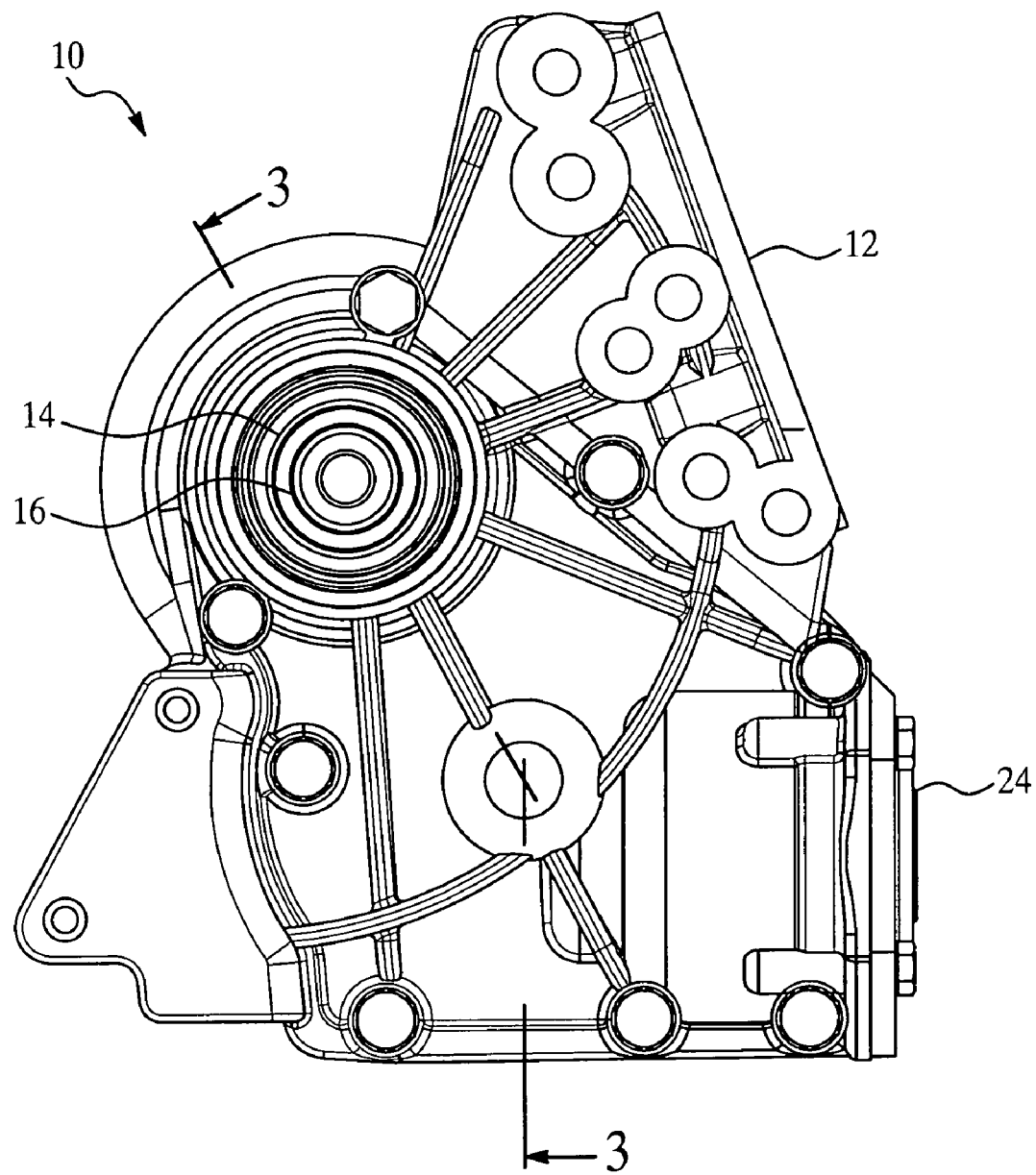
FIG. 2 is an end elevational view of the power take-off unit of FIG. 1.

Referring to the Figures and in particular FIGS. 1 and 2, one embodiment of a power take-off unit 10, according to the present invention, is shown for a transmission (not shown) of a vehicle (not shown) such as a motor vehicle. The power take-off unit 10 includes a housing or case 12 for enclosing components of the unit 10. Specifically, the power take-off unit 10 includes an input shaft 14, a through shaft 16, a secondary shaft 18, a first drive gear 20, a second drive gear 22, and an output gear 24.

Figure 3:
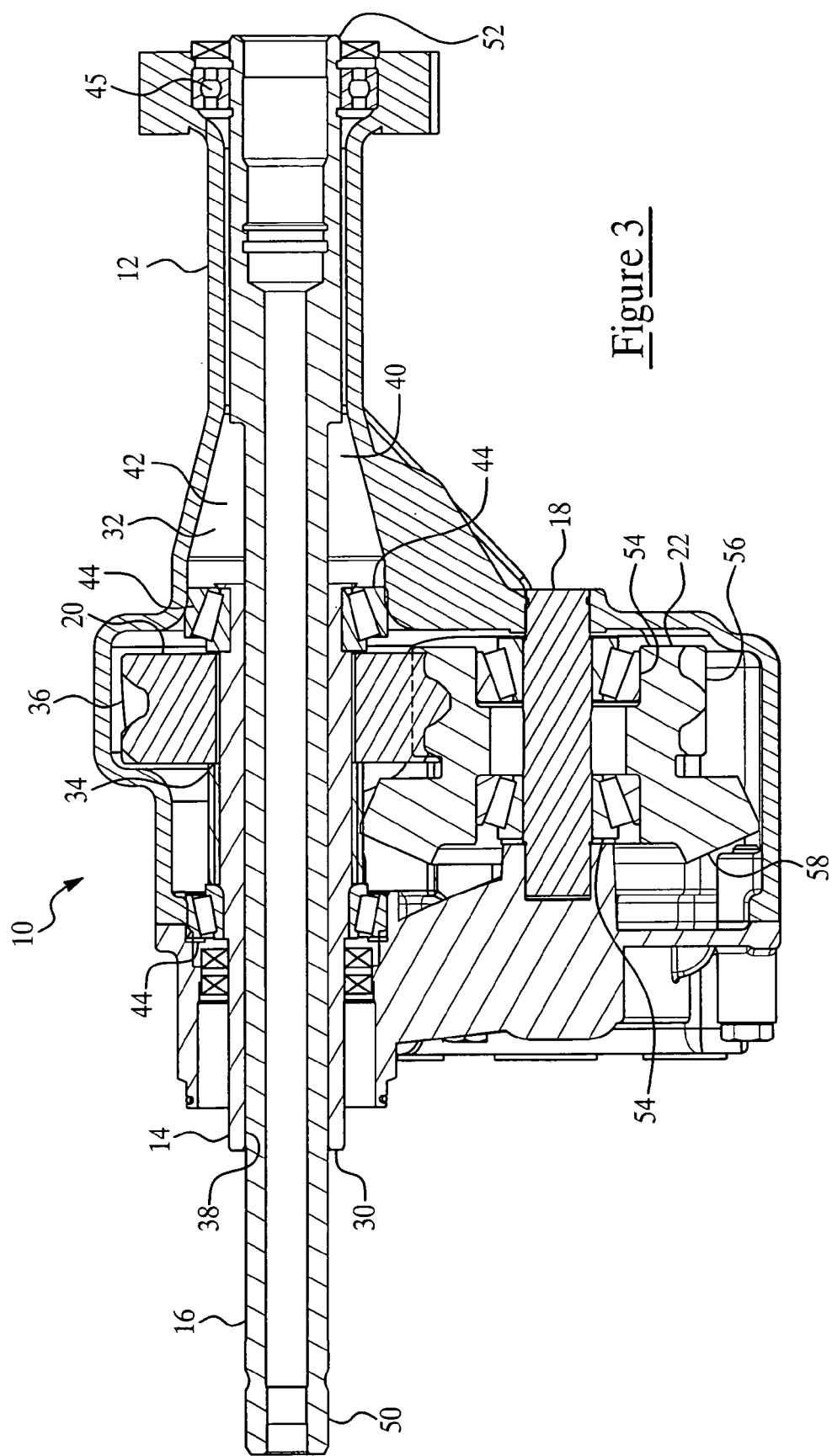
FIG. 3 is a sectional view taken along line 3-3 of FIG. 2.

The power take-off unit 10 forms a portion of a vehicle powertrain and is responsible for taking the torque generated by a prime mover, such as an internal combustion engine, as delivered through a transmission and distribute it to drive all the wheels of the vehicle. As illustrated in FIG. 3, the input shaft 14 has an input end 30 and an output end 32. In one embodiment, the input shaft 14 also includes a longitudinal through-bore 38 that is adapted to slidingly receive and retain the through shaft 16. The torque from the transmission (not shown) is operatively provided to the input end 30 of the input shaft 14 via a differential housing (not shown). The first drive gear 20 is operatively mounted to the input shaft 14 at 34 and includes a first set of drive teeth 36. It should be appreciated that the through shaft 16 is concentric with the input shaft 14.

The power take-off unit 10 includes a plurality of tapered roller bearings 44 within the housing 12 to rotationally support the input shaft 14. The power take-off unit 10 also includes at least one roller bearing 45 within the housing 12 to rotationally support the through shaft 16. Thus, both the input shaft 14 and the output shaft 16 are supported by the bearings 44 and 45, respectively. In this manner, the through shaft 16 extends longitudinally beyond both the input end 30 and the output end 32 of the input shaft 14 and is adapted to transfer torque from a differential gear (not shown) of the differential (not shown) to drive a first set of wheels (not shown) of the vehicle. More specifically, the through shaft 16 also includes a first longitudinal end 50 and a second longitudinal end 52. The first longitudinal end 50 is adapted to extend laterally from the power take-off unit 10 and pass through a portion of the transmission to drive one of the front wheels. The second longitudinal end 52 is adapted to extend laterally from the power take-off unit 10 opposite the first longitudinal end 50 to receive input or torque from a differential gear (not shown) of the differential (not shown). It should be appreciated that the through shaft 16 is optional to the power take-off unit 10 and, in the embodiment illustrated, passes through the input shaft 14.

The secondary shaft 18 is mounted in the housing 12 in parallel relationship to the input shaft 14 and the through shaft 16 and is rotationally supported by a plurality of tapered roller bearings 54 within the power take-off housing 12. The second drive gear 22 is operatively mounted on the secondary shaft 18. The second drive gear 22 has a second set of drive teeth 56 and a first set of bevel teeth 58. The second set of drive teeth 56 are meshingly engaged to the first drive teeth 36 of the first drive gear 20. In one embodiment, the first set of drive teeth 36 and the second set of drive teeth 56 are corresponding helically cut teeth. It should be appreciated that the helically cut teeth provide the advantages of greater load carrying capacity while allowing the gear set to be relatively small and close fitting with low mechanical noise output.

Figure 4:
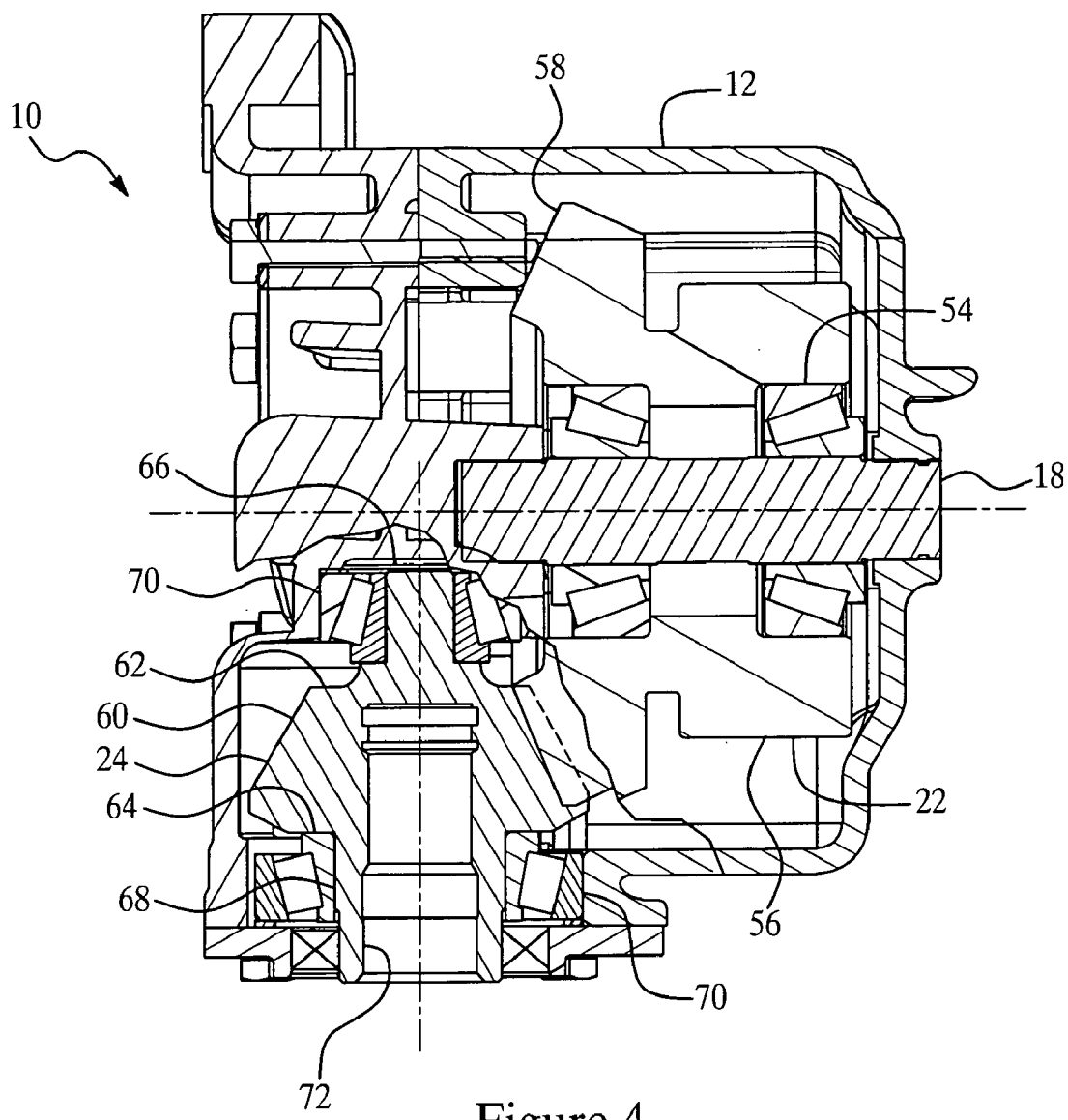
FIG. 4 is a sectional view taken along line 4-4 of FIG. 1.

Referring to FIG. 4, the output gear 24 is operatively and rotationally mounted in the housing 12 transversely to the second drive gear 22. The output gear 24 has a second set of bevel teeth 60 that are meshingly engaged to the first set of bevel teeth 58 on the second drive gear 22. The output gear 24 is further defined as having a rotational axis "A". A first face 62 and a second face 64 radially extend from the axis "A" on opposing sides of the second set of bevel teeth 60. The output gear 24 further includes a first shaft portion 66 that extends perpendicularly outward from the first face 62 along the axis "A" and a second shaft portion 68 that extends perpendicularly outward from the second face 64 along axis "A". The first and second shaft portions 66, 68 are rotatively supported in the housing 12 by a plurality of tapered roller bearings 70.

The second shaft portion 68 that extends outward from the second face 64 of the output gear 24 is oriented to extend outwardly from the housing 12 of the power take-off unit 10. The second shaft portion 68 includes a longitudinal bore 72 that is adapted to accept an operative connection to provide torque to drive a second set of wheels (not shown) of the vehicle. More specifically, the longitudinal bore 72 of the second shaft portion 68 is transverse to the input and through shafts 14 and 16 such that the longitudinal bore 72 is parallel to the longitudinal axis of the vehicle in which the power take-off unit 10 is mounted. This provides the capability to operatively connect the output gear 24 of the power take-off unit 10 with some manner of drive assembly that routes the torque provided by the output gear 24 to the rear wheels of the vehicle. Though beyond the scope of this invention, this operative connection may be accomplished in any number of ways. For example, the longitudinal bore 72 may be operatively connected to a prop shaft that extends rearward down the length of the vehicle to an assembly that provides torque translation to the right and left rear wheel assemblies.

Thus, the power take-off unit 10 of the present invention provides four-wheel drive and may be employed with a transverse transmission or transaxle of a vehicle. The power take-off unit 10 has reduced size and complexity compared to conventional units. The power take-off unit 10 reduces the number of parts, overall size, and cost. The power take-off unit 10 also employs a direct drive to one set of drive wheels without clutching mechanisms or planetary gear assemblies, again reducing the number of parts, size, and weight of the unit 10. Further the power take-off unit 10 provides torque to the wheels as a separate unit, avoiding increasing the complexity and bulk of the transmission or transaxle. Further, the overall reduction in the number of components and reduction in the size, and weight of the power take-off unit 10 is cost efficient.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A power take-off unit comprising:
    an input shaft for operative connection to a source of motive power;
    a first drive gear operatively mounted to said input shaft and having a first set of drive teeth;
    a second drive gear having a second set of drive teeth and a first set of bevel teeth, said second set of drive teeth meshingly engaged to said first drive teeth of said first drive gear; and
    an output gear operatively and rotationally mounted transversely to said second drive gear and having a second set of bevel teeth meshingly engaged to said first set of bevel teeth of said second drive gear, said output gear having a rotational axis, with a first face and a second face of said output gear radially extending from said axis on opposing sides of said second set of bevel teeth, said output gear further including a first shaft portion extending outward from said first face along said axis and a second shaft portion extending outward from said second face along said axis, and being adapted to transfer torque transversely from said input shaft to drive a set of wheels of a vehicle.

2. A power take-off unit as set forth in claim 1 wherein said first set of drive teeth of said first drive gear and said second set of drive teeth of said second drive gear are helically cut teeth.

3. A power take-off unit as set forth in claim 1 including a secondary shaft mounted in parallel relationship to said input shaft, said secondary shaft rotationally supported by a plurality of tapered bearings within said power take-off unit, said second drive gear being operatively mounted on said secondary shaft.

4. A power take-off unit as set forth in claim 1 including a through shaft adapted to transfer torque to drive another set of wheels of the vehicle.

5. A power take-off unit as set forth in claim 4 wherein said input shaft further includes a longitudinal through-bore to slidingly receive and retain said through shaft, said through shaft extending longitudinally beyond both ends of said input shaft.

6. A power take-off unit as set forth in claim 1 including a plurality of tapered bearings to rotationally support said input shaft.

7. A power take-off unit as set forth in claim 1 including a plurality of tapered bearings to rotationally support said first shaft portion and said second shaft portion of said output gear.

8. A power take-off unit as set forth in claim 1 wherein said second shaft portion extending outward from said second face is oriented outwardly from said power take-off unit and further includes a longitudinal bore adapted to accept an operative connection to provide torque to drive the set of wheels.

9. A four-wheel drive power take-off unit to be employed with a transverse mounted transmission in a vehicle to provide transfer of torque to both front and rear wheels of the vehicle comprising:
    an input shaft having an input end and an output end, said input end for operative connection to a source of motive power from the transmission;
    a through shaft having a first longitudinal end and a second longitudinal end, said first longitudinal end adapted to extend laterally from said power take-off unit and to drive one front wheel, said second longitudinal end adapted to extend laterally from said power take-off unit opposite said first longitudinal end for operative connection to a source of motive power;
    a first drive gear operatively mounted to said input shaft and having a first set of drive teeth;
    a second drive gear having a second set of drive teeth and a first set of bevel teeth, said second set of drive teeth meshingly engaged to said first drive teeth of said first drive gear; and
    an output gear operatively mounted within said power take-off unit transversely to said second drive gear and having a second set of bevel teeth meshingly engaged to said first set of bevel teeth of said second drive gear, said output gear being adapted to transfer torque transversely from said input shaft to drive the rear wheels;
    said output gear also being mounted for rotation about a rotational axis, with a first face and a second face of said output gear radially extending from said axis on opposing sides of said second set of bevel teeth, said output gear further including a first shaft portion extending outward from said first face along said axis and a second shaft portion extending outward from said second face along said axis.

10. A power take-off unit as set forth in claim 9 wherein said first set of drive teeth of said first drive gear and said second set of drive teeth of said second drive gear are helically cut teeth.

11. A power take-off unit as set forth in claim 9 including a secondary shaft mounted in parallel relationship to said input shaft and said through shaft, and a plurality of tapered bearings to rotationally support said secondary shaft, said second drive gear being operatively mounted on said secondary shaft.

12. A power take-off unit as set forth in claim 9 wherein said input shaft further includes a longitudinal through-bore to slidingly receive said through shaft, said through shaft extending longitudinally beyond both said input end and said output end of said input shaft.

13. A power take-off unit as set forth in claim 9 including a plurality of tapered bearings to rotationally support said input shaft.

14. A power take-off unit as set forth in claim 9 including a plurality of tapered bearings to rotationally support said first shaft portion and said second shaft portion of said output gear.

15. A power take-off unit as set forth in claim 9 wherein said second shaft portion extends outward from said second face and is oriented outwardly from said power take-off unit and further includes a longitudinal bore adapted to accept an operative connection to provide torque to drive the rear wheels.

16. A four-wheel drive power take-off unit to be employed with a transverse mounted transmission in a vehicle to provide transfer of torque to both front and rear wheels of the vehicle comprising:

an input shaft having an input end, an output end, and a longitudinal through-bore, said input end for operative connection to a source of motive power from the transmission;

a through shaft having a first longitudinal end and a second longitudinal end, said through shaft being adapted to be slidingly received within said longitudinal through-bore of said input shaft, said first longitudinal end of said through shaft being adapted to extend laterally beyond said input end of said input shaft and to drive one front wheel, said second longitudinal end of said through shaft being adapted to extend laterally beyond said output end of said input shaft opposite said first longitudinal end for operative connection to a source of motive power;

a secondary shaft mounted in parallel relationship to said input shaft and said through shaft;

a first drive gear operatively mounted to said input shaft and having a first set of drive teeth;

a second drive gear operatively mounted to said secondary shaft having a second set of drive teeth and a first set of bevel teeth, said second set of drive teeth being meshingly engaged to said first drive teeth of said first drive gear; and an output gear operatively mounted within said power take-off unit transversely to said second drive gear and having a second set of bevel teeth meshingly engaged to said first set of bevel teeth of said second drive gear, said output gear being mounted for rotation about a rotational axis, with a first face and a second face of said output gear radially extending from said axis on opposing sides of said second set of bevel teeth, said output gear further including a first shaft portion extending outward from said first face along said axis and a second shaft portion extending outward from said second face alone said axis, said output gear also being adapted to transfer torque transversely from said input shaft to drive the rear wheels.

17. A power take-off unit as set forth in claim 16 wherein said second shaft portion extending outward from said second face is oriented outwardly from said power take-off unit and further includes a longitudinal bore adapted to accept an operative connection to provide torque to drive the rear wheels.

* * * * *